US006685004B2

(12) United States Patent
Fargo et al.

(10) Patent No.: US 6,685,004 B2
(45) Date of Patent: Feb. 3, 2004

(54) ESCALATOR DRIVE MACHINE

(75) Inventors: Richard Fargo, Plainville, CT (US); Charles Darling, New Britain, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/200,787

(22) Filed: Jul. 22, 2002

(65) Prior Publication Data

US 2002/0179406 A1 Dec. 5, 2002

Related U.S. Application Data

(62) Division of application No. 09/670,432, filed on Sep. 26, 2000, now Pat. No. 6,450,317.

(51) Int. Cl.[7] .......... B65G 23/02

(52) U.S. Cl. .......... 198/330; 198/331; 198/333

(58) Field of Search .......... 198/333, 330, 198/331

(56) References Cited

U.S. PATENT DOCUMENTS 308,867 A 12/1884 Ayres
812,374 A 2/1906 Smead
2,039,994 A 5/1936 Herker
3,268,065 A 8/1966 Thomson
3,321,060 A 5/1967 Mullis et al. .......... 198/331 X
3,365,051 A 1/1968 Mullis et al. .......... 198/330 X
3,366,217 A 1/1968 Tosato et al. .......... 198/330 X
3,414,108 A 12/1968 Jackson et al.
3,677,388 A 7/1972 Boltrek et al.
3,749,224 A 7/1973 Engeler .......... 198/331
3,967,720 A 7/1976 Arieh
4,058,204 A 11/1977 Arieh
4,082,173 A 4/1978 Simon-Kochloffel .......... 198/330
4,397,096 A 8/1983 Kraft et al.
4,535,880 A 8/1985 Boltrek
4,636,181 A 1/1987 Savolainen et al.
4,895,240 A 1/1990 Bruehl et al.
5,115,899 A 5/1992 Nakatani
5,184,710 A 2/1993 Nakatani
5,307,920 A 5/1994 Meyer et al.
5,308,725 A 5/1994 Yu et al.
5,755,315 A 5/1998 Wallbaum et al.
5,881,859 A 3/1999 Bianchi
6,450,317 B1 * 9/2002 Fargo et al. .......... 198/333
6,457,573 B1 10/2002 Ostermeier et al.

FOREIGN PATENT DOCUMENTS

| | | |
|---|---|---|
| AU | B7898487 | 4/1988 |
| DE | 2 252 763 | 5/1974 |
| DE | 25 26 552 | 1/1976 |
| EP | 0 389 336 | 9/1990 |
| GB | 272016 | 6/1927 |

* cited by examiner

*Primary Examiner*—James R. Bidwell

(57) ABSTRACT

An escalator drive machine includes a motor output sheave connected to a drive motor through a belt reduction assembly including a main output sheave. A drive belt extends from the belt reduction assembly and is guided along a plurality of guide sheaves to engage the step chain and propel the escalator tread plates. In addition, by locating a pinch roller adjacent the handrail, the drive belt and handrail can be pinched together to provide a motive force to the handrail. The drive belt thereby synchronously drives the handrail. In another embodiment the drive machine includes a counter-rotating motor to drive a drive belt on each side of the escalator system.

9 Claims, 3 Drawing Sheets

ESCALATOR DRIVE MACHINE

This application is a divisional of U.S. patent application No. 09/670,432, now U.S. Pat. No. 6,450,317, entitled "Escalator Drive Machine," filed Sep. 26, 2000.

BACKGROUND OF THE INVENTION

This invention relates to a passenger conveyor system, and more particularly to a drive machine that includes a drive belt to propel escalator tread plates.

A typical passenger conveyor, such as an escalator or moving walk, includes a frame, balustrades with movable handrails, tread plates, a drive system and a step chain for propelling the tread plates. The frame includes a truss section on both left and right hand sides of the frame. Each truss section has two end sections forming landings, connected by an inclined midsection. The upper landing usually houses the escalator drive system or machine positioned between the trusses.

The drive system of an escalator typically consists of a step chain, a step chain drive sprocket, an axle and a drive motor. The step chain travels a continuous, closed loop, running from one elevation to the other elevation, and back. The drive motor drives the chain, with the final drive commonly being a pair of toothed wheels located in a turn around area at the top of the escalator. The toothed wheels are based on tread plate size and are commonly of a 750 mm diameter for most escalator systems. The wheel drives the chain to which the tread plates are attached. Alternative approaches involve one or more machines located in the escalator incline. These machines also drive the step chain with a toothed wheel.

Escalators driven by a toothed wheel have some inherent vibration caused by a cogging effect associated with the discrete interface points between the teeth and the chain. Reducing the length of the links reduces the cogging effect, at the expense of increasing the cost of the step chain. Additional joints in the step chain also increase the stretch of the step chain as each joint wears.

The large drive wheels in the turn around also have a very large torque requirement. In order to maintain a reasonable machine size to produce this torque, multiple stages of gearing, and a chain reduction are needed. This can be costly and results in energy loss.

SUMMARY OF THE INVENTION

An escalator system designed according to this invention improves escalator operation by locating a belt drive machine within preexisting machine spaces under an escalator landing. The belt drive provides less cogging effect since the tooth spacing on the belt is much less than is practical with a chain.

The escalator drive machine includes a motor output sheave connected to a drive motor through a belt reduction assembly including a main output sheave. The main output sheave drives a small output sheave which drives the drive belt. The belt extends from the small output sheave and is guided along a plurality of guide sheaves located adjacent the step chain. A plurality of output belt teeth engage corresponding link teeth along the length of each step chain link. The guide sheaves are preferably located in parallel with a substantially straight length of links in the step chain. In one example, it has been determined that only 250 mm of engagement length between the belt and the links are required to transmit a load necessary to operate a common escalator system.

In addition, the drive belt can also drive the moving handrails of an escalator. By locating a pinch roller adjacent the handrail, the drive belt and handrail can be pinched together to provide a motive force to the handrail. The drive belt thereby synchronously drives the handrail.

In another embodiment the drive machine includes a counter-rotating motor which includes a wound motor primary and a motor secondary which rotate in opposite directions on a bearing stand. In this embodiment, the motor primary will engage a main sheave on one side of the escalator system using a first belt reduction assembly, while the motor secondary will engage another main sheave on the opposite side using a second belt reduction assembly which rotates in a direction opposite the first. This embodiment allows the use of the more efficient 6 pole counter-rotating motor which is approximately ½ the size of a common 12 pole motor.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
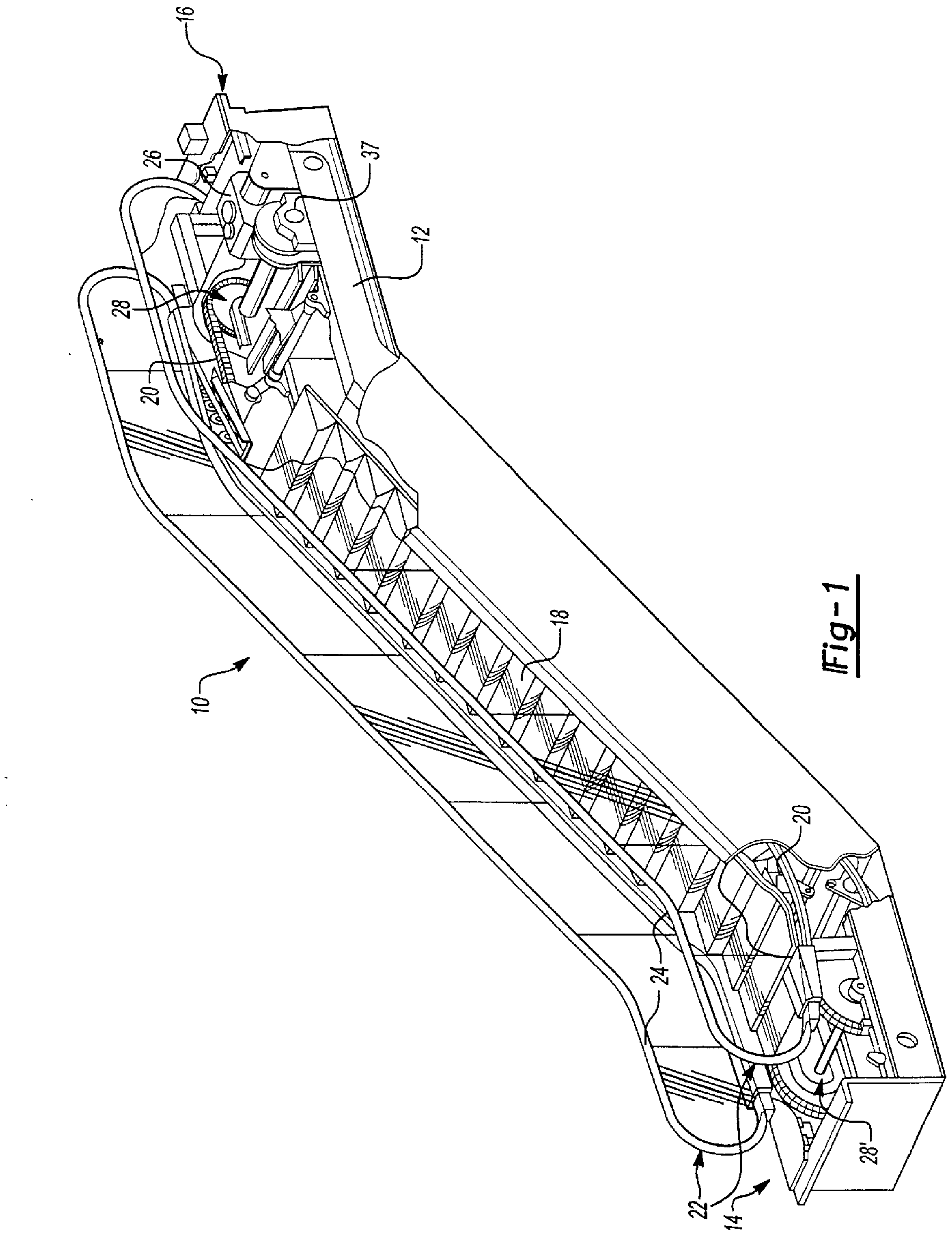
FIG. 1 is a perspective view of an escalator system.

FIG. 1 illustrates an escalator system 10. It should become apparent in the ensuing description that the invention is applicable to other passenger conveyors, such as moving walks. The escalator system 10 generally includes a truss 12 extending between a lower landing 14 and an upper landing 16. A plurality of sequentially connected treadplates 18 are connected to a step chain 20 and travel through a closed loop path within the truss 12. A pair of balustrades 22 include moving handrails 24. A machine 26 is typically located in a machine space 28 under the upper landing 16, however, an additional machine space 28' can be located under the lower landing 14. As will be further described below, the drive machine 26 preferably drives the tread plates 18 and handrails 24 through a drive belt 30 (FIG. 2).

Figure 2:
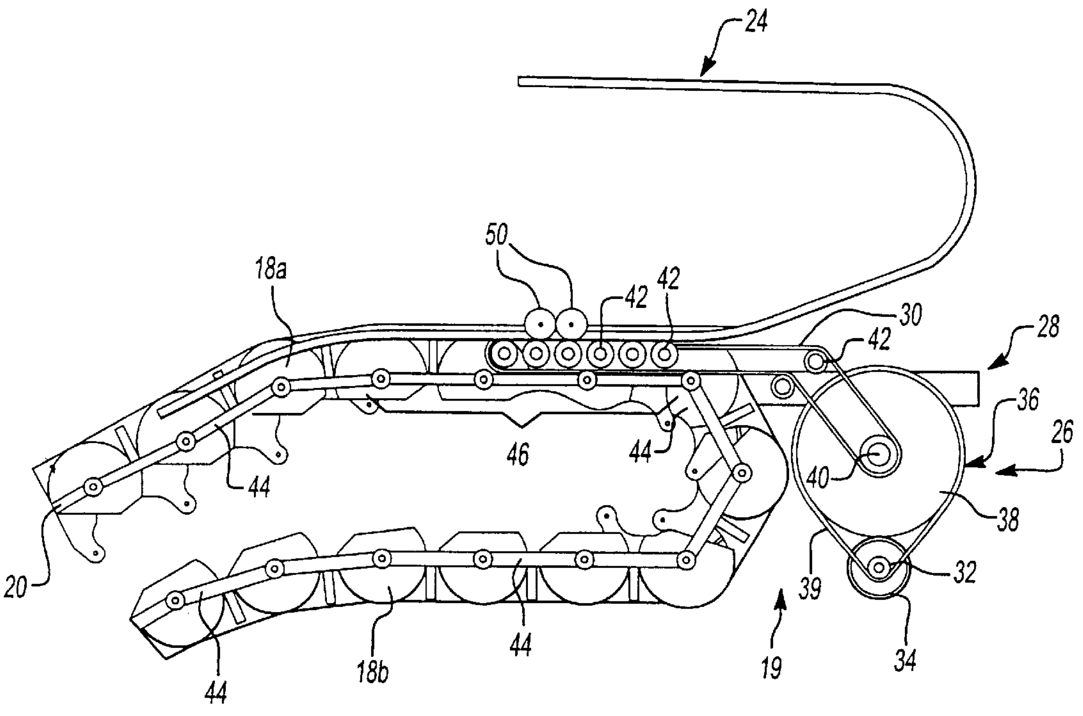
FIG. 2 is an expanded view of an escalator machine space.

Referring to FIG. 2, the machine space 28 is illustrated. The tread plates 18 make a 180 degree heading change in the turn around area 19 located under the lower landing 14 and upper landing 16. The tread plates 18 are pivotally attached to the step chain 20 and follow a closed loop path of the step chain 20, running from one landing to the other, and back again. The drive machine 26 includes a motor output sheave 32 connected to a drive motor 34 through a belt reduction assembly 36 including a main output sheave 38 driven by an output belt 39. In one preferred embodiment, the motor output sheave 32 is of approximately 75 mm diameter while the main sheave 38 is approximately 750 mm diameter. Such sizing assures that the machine 26 according to the present invention will fit into preexisting machine spaces 28 (FIG. 1) while using a 600 RPM motor (12 poles for 50 Hz operation). The disclosed belt reduction preferably allows the replacement of sheaves to change the speed for 50 or 60 Hz applications, or different step speeds.

Alternatively, a gearbox 37 (FIG. 1) can be provided in place of the belt reduction assembly 36. A 25:1 reduction is preferred to provide a reasonably sized motor that rotates at approximately 1500 RPM and fits into preexisting machine spaces 28.

The main output sheave 38 drives a small output sheave 40 which drives the drive belt 30. The small output sheave 40 is preferably of approximately 150 mm diameter which will require about ⅕ the torque of a traditional 750 mm diameter chain drive, while rotating at approximately 60 RPM instead of 12 RPM.

Figure 3:
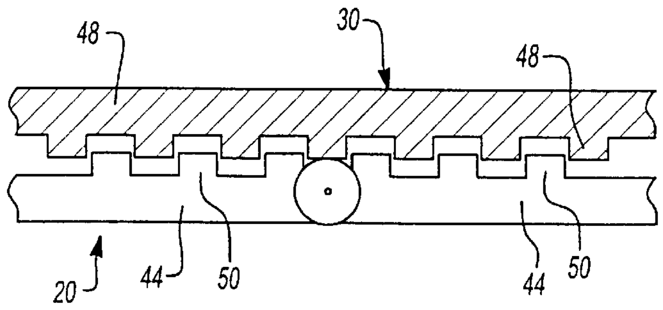
FIG. 3 is an expanded view of a drive belt engaged with links in a step chain.

The belt 30 extends from the small output sheave 40 and is guided along a plurality of guide sheaves 42 located adjacent the step chain 20. A plurality of output belt teeth 48 engage corresponding link teeth 50 along the length of each link 44 (FIG. 3). The guide sheaves 42 are preferably located in parallel with a substantially straight length of links 46 in the step chain 20. The straight length assures that the belt teeth 48 effectively engage with corresponding link teeth 50. In one example, it has been determined that only 250 mm of engagement length between the belt 30 and the links 44 are required to transmit a load necessary to operate a common escalator system 10. A substantially straight length of links 44 that will benefit from the present invention are located along the flat step area of tread plates 18 along the upper landing 16. It should be realized that the lower landing 14 and other areas, such as along the truss 12 (FIG. 1) will benefit from the present inventor.

The tread plates 18 when being returned in the turn around 19 deviate from a constant radius in order to eliminate the polygon effect associated with rigid links 44. Preferably, the turn around 19 is substantially bullet or parabolic in shape. In that, the distance between the passenger tread plates 18*a* and the return tread plates 18*b* are not parallel in the turn around 19. In one example, it had been determined that a 5 mm increased from a constant diameter of 700 mm is effective to greatly reduce vibrations.

In addition, the moving handrails 24 can also be driven by the drive belt 30. The return portion (moving toward the small output sheave 40) of the drive belt 30 is moving in the same direction and at the same speed as the return portion of the moving handrail 24. By locating a pinch roller 80 adjacent the handrail 24, the drive belt 30 and handrail 24 can be pinched together to provide a motive force to the handrail 24. The drive belt 30 thereby synchronously drives the handrail 24. Preferably, a plurality of pinch rollers 80 engages the handrail 24 within the balustrades 22. The handrail material should be of a durable material in order to prevent damage, since it is driven on the visible side.

Figure 4:
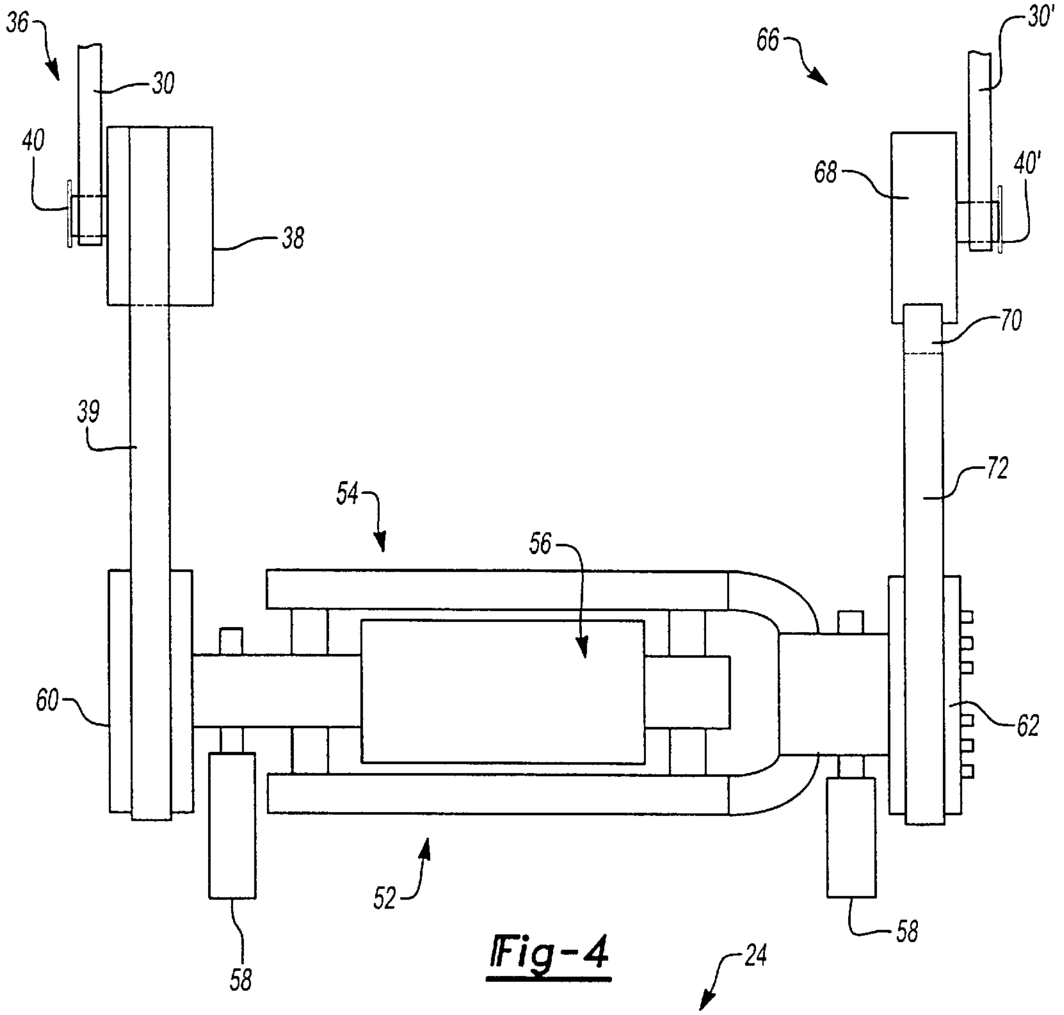
FIG. 4 is an expanded view of a counter-rotating motor for use in an alternate embodiment of an escalator system designed according to the present invention.

Referring to FIG. 4, the machine according to the present invention can additionally or alternatively benefit from a counter-rotating motor 52. The counter-rotating motor 52 is described in more detail in U.S. Pat. No. 6,202,793 entitled "MACHINEROOMLESS ELEVATOR WITH 3:1+1:1 ROBED COUNTER-ROTATING MACHINE" which is incorporated by reference in its entirety into this description.

The counter-rotating motor 52 includes a wound motor primary 54 and a motor secondary 56 which rotate in opposite directions on a bearing stand 58. The wound motor primary 54 drives a primary drive sheave 60 while the wound motor secondary 56 drives a secondary drive sheave 62. The primary drive sheave 60 drives a pair of reverse sheaves 70 through an output belt 72 to drive a belt reduction assembly 66 opposite belt reduction assembly 36, belt reduction assembly 66 is located on one side of the escalator system 10 while belt reduction assembly 36 is located on the opposite side of the escalator system 10. Accordingly, main output sheave 68 must rotate in a direction opposite main output sheave 38. The drive belt 30, 30' extend from the associated small output sheave 40, 40' to engage the step chain as described above.

Figure 5:
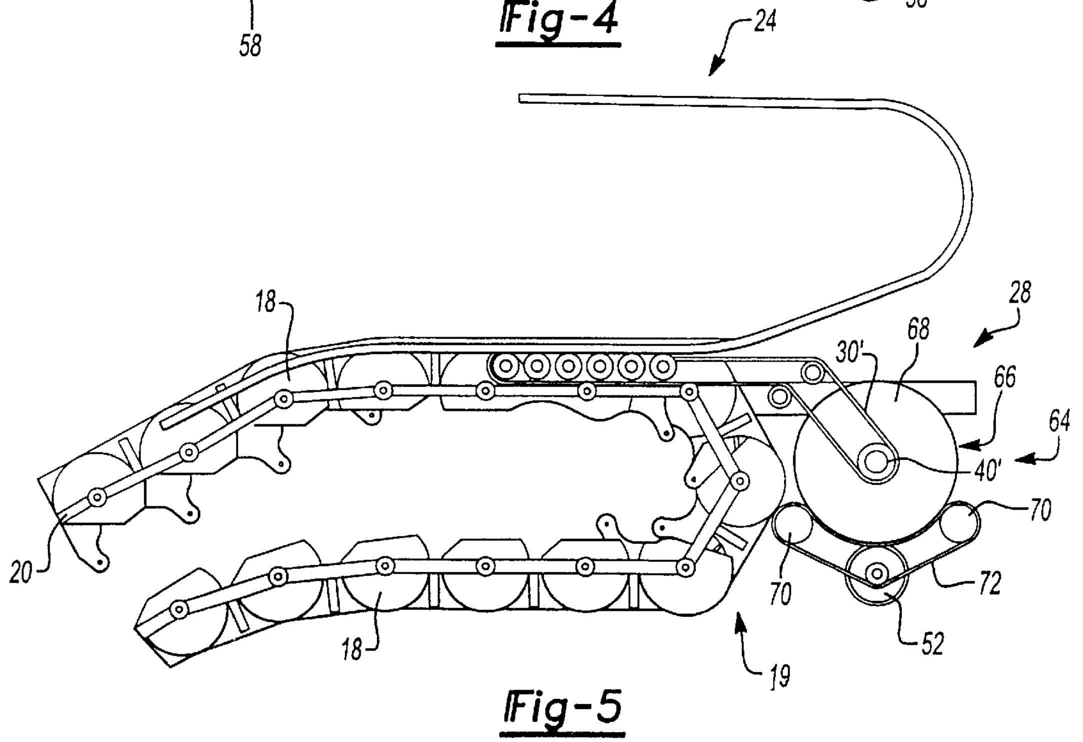
FIG. 5 is another embodiment of a belt arrangement according to the present invention using the counter-rotating motor of FIG. 4.

Referring to FIG. 5, another embodiment of a drive machine 64 preferably includes the counter-rotating motor 52 to drive a belt reduction assembly 66 including the main output sheave 68 and reverse sheaves 70. The primary drive sheave 60 of the counter-rotating motor 52 will engage a main sheave 38 on one side of the escalator system 10 with the output belt 39 (FIGS. 2 and 4). The output belt 39 follows the belt path illustrated in FIG. 2. The secondary sheave 62 engages the main sheave 68 on the opposite side with the output belt 72 as illustrated in FIG. 5. This embodiment allows the use of an efficient 6 pole counter-rotating motor 52 which is approximately ½ the size of the common 12 pole motor.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A passenger conveyer system comprising:

a plurality of tread plates connected by a step chain;

a drive belt driveable by an output sheave that is driven by a drive machine; and a plurality of engagement sheaves, located in parallel with and spaced along a length of said step chain, said engagement sheaves engaging said drive belt to maintain said drive belt engaged with said length of said step chain in a substantially parallel relationship to propel said plurality of tread plates.

2. A passenger conveyer system as recited in claim 1, wherein said drive belt includes a plurality of belt teeth and said step chain includes a plurality of links, each of said links having a plurality of link teeth, said belt teeth engageable with said plurality of link teeth.

3. A passenger conveyer system as recited in claim 1, including a movable handrail, said movable handrail engageable with said drive belt to synchronously propel said movable handrail with said plurality of tread plates.

4. A passenger conveyer system as recited in claim 3, including a plurality of pinch sheaves to engage said drive belt with said movable hand rail.

5. A passenger conveyer system as recited in claim 1, wherein said plurality of tread plates pass through a turn around area in which said plurality of tread plates change heading along a path forming a substantially non-continuous radius.

6. A passenger conveyer system as recited in claim 5, wherein said plurality of tread plates change heading along a substantially parabolic path.

7. A passenger conveyer system as recited in claim 1, wherein said drive machine includes a counter-rotating motor.

8. A passenger conveyer system as recited in claim 1, further comprising a belt reduction assembly attached to said drive machine, said belt reduction assembly driving said drive belt.

9. A passenger conveyer system as recited in any of claims 1–8, wherein at least three of said engagement sheaves engage said drive belt with said length of said step chain.

* * * * *